United States Patent [19]

Sjögren

[11] 4,093,062
[45] June 6, 1978

[54] METHOD OF AND APPARATUS FOR FEEDING ARTICLES

[75] Inventor: Börje Lennart Sjögren, Huddinge, Sweden

[73] Assignee: AB Wicanders Korkfabriker, Alvangen, Sweden

[21] Appl. No.: 682,761

[22] Filed: May 3, 1976

[30] Foreign Application Priority Data

May 7, 1975   Sweden .............................. 7505342

[51] Int. Cl.² ............................................. B65G 47/24
[52] U.S. Cl. .................................... 198/380; 198/392; 302/2 R
[58] Field of Search ............... 198/380, 392, 394, 396, 198/455, 493; 221/160, 162, 163, 168, 172; 302/2 R, 11

[56] References Cited

U.S. PATENT DOCUMENTS

| | | | |
|---|---|---|---|
| 3,012,651 | 12/1961 | Hawkes | 198/380 |
| 3,101,832 | 8/1963 | Wyle et al. | 198/380 |
| 3,224,554 | 12/1965 | Moulder et al. | 198/455 |
| 3,300,022 | 1/1967 | Sterling | 198/380 |
| 3,330,403 | 7/1967 | Roberts et al. | 198/392 |
| 3,376,970 | 4/1968 | Roseberg | 198/455 |
| 3,672,727 | 6/1972 | Griffin | 198/380 |
| 3,710,920 | 1/1973 | Sterling | 198/380 |
| 3,722,658 | 3/1973 | Sterling | 198/392 |
| 3,726,385 | 4/1973 | Sterling | 198/392 |
| 3,734,268 | 5/1973 | Burger et al. | 198/380 |

*Primary Examiner*—Evon C. Blunk
*Assistant Examiner*—Richard K. Thomson
*Attorney, Agent, or Firm*—Brumbaugh, Graves, Donohue & Raymond

[57] ABSTRACT

A method of and apparatus for orienting and feeding articles, in particular closure caps having a panel, a skirt and an ear extending from the skirt wherein articles are deposited on an inclined, preferably conical, surface from which they slide down onto a slowly rotating table. Articles are urged by airflow to a peripheral gap which receives only correctly oriented articles and conveys them to a discharge station. Incorrectly oriented articles are returned by airflow to the inclined surface to be re-presented.

8 Claims, 6 Drawing Figures

METHOD OF AND APPARATUS FOR FEEDING ARTICLES

This invention relates to a method of and apparatus for orienting and feeding articles. The invention is particularly, though not exclusively, applicable to the orienting and feeding of closure caps, more particularly closure caps of the type having a disc-like panel surrounded by a cylindrical wall terminating in a free edge with a substantially radially extending gripping ear extending outwardly from said free edge away from said panel.

Caps such as tear-off caps are shaped from a flat material blank, and then pass through various manufacturing stages, for instance to be provided with a sealing layer, until they are finally supplied one by one in a specific manner to a container sealing machine. Throughout these steps of manufacture the caps must be orientated and fed in a controlled manner. This creates problems to which numerous solutions have already been suggested.

According to one proposed solution an apparatus is used in which the caps are placed haphazardly on a rapidly rotating disc and are thrown by centrifugal force towards the periphery of the disc where a collecting channel is constructed in such a manner that the caps are collected side by side in this channel with their disc-shaped upper panels against the rotating table. However, it has been found that this known device has certain drawbacks since those caps which are the wrong way up block the collecting channel and can lead to undesired pile-ups of caps which, combined with the high speed of rotation of the disc, cause interruptions in operation and can damage the caps by altering the position of the gripping ear.

It is an aim of this invention to reduce these problems.

According to one aspect of the present invention there is provided a method of orienting and feeding articles by depositing the articles on an inclined surface located above a slowly rotating table, whereby the articles slide down onto the table, urging the articles by air flow towards a gap defined between the periphery of the table and a member located thereabove, the gap being dimensioned so as to receive only those of the articles which are correctly oriented, discharging articles which are received in the gap and carried therein by the table through a discharge station at the periphery of the table and returning those of the articles which are not correctly oriented back towards the inclined surface.

In another aspect the invention provides apparatus for orienting and feeding articles including a table which is slowly rotatable, an inclined surface located above the table, a gap defined between the periphery of the table and a member located thereabove, the gap being dimensioned to receive only articles which are correctly oriented, means to provide outwardly directed airflow to urge articles on the table towards the gap, a discharge station at the periphery of the table through which, in use, articles received in the gap and carried therein by the table are discharged, and means for returning those of the articles which are not correctly oriented back towards the inclined surface.

The inclined surface is preferably conical. The air flow to urge the articles towards the gap may issue from between the bottom of the inclined surface and the table, or through nozzles located inwardly of the gap.

Preferably, the incorrectly oriented articles are returned towards the inclined surface by airflow through openings in the table inwardly of the gap at positions which will not be occupied by articles received in the gap.

The invention will be more clearly understood from the following description which is given by way of example only, with reference to the accompanying drawings, in which:-

Like numerals indicate like parts in the drawings.

Figure 1:
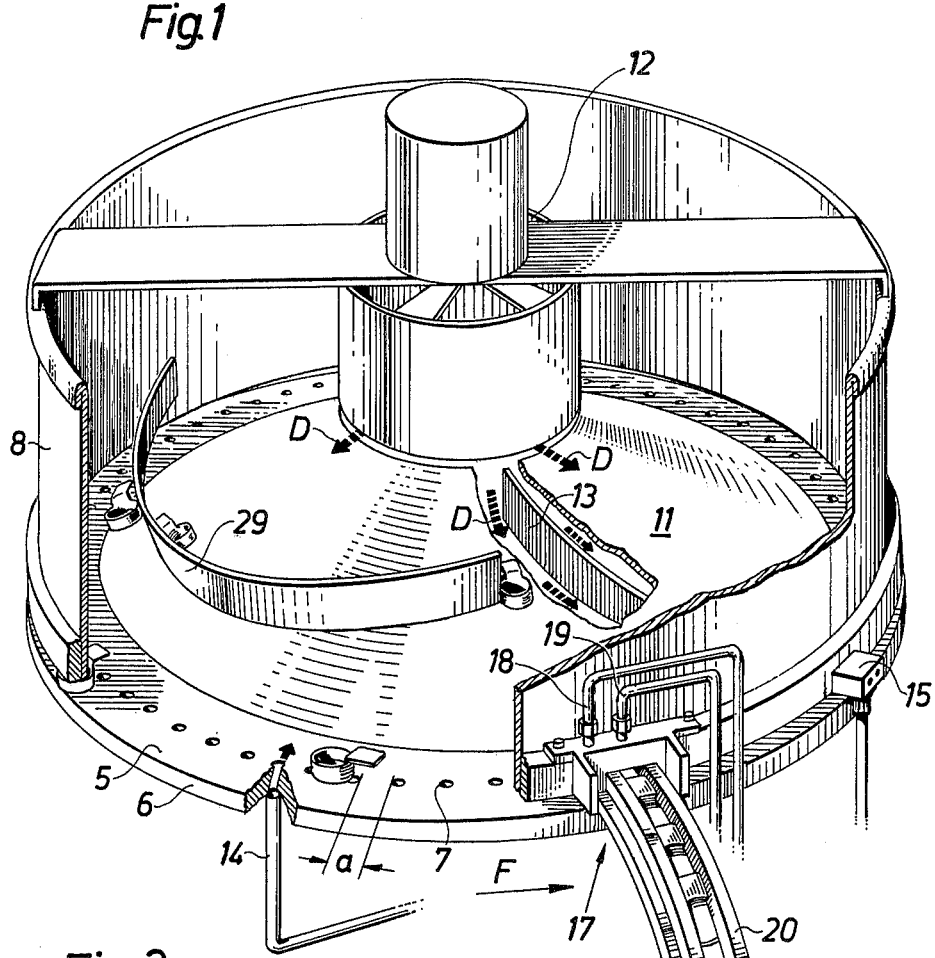
FIG. 1 shows a perspective view of a first embodiment of apparatus according to the invention, partly in section.

The orienting and feeding apparatus shown in the drawings is particularly intended for bottle caps of the type shown in the Figures and comprising a substantially bowl-shaped main portion having a flat bottom panel 1 and a cylindrical wall part 2 terminating in a free edge 3. An ear 4 extends from the free edge 3, first in the form of a short continuation 2a of the wall part and then radially outwardly.

Figure 2:
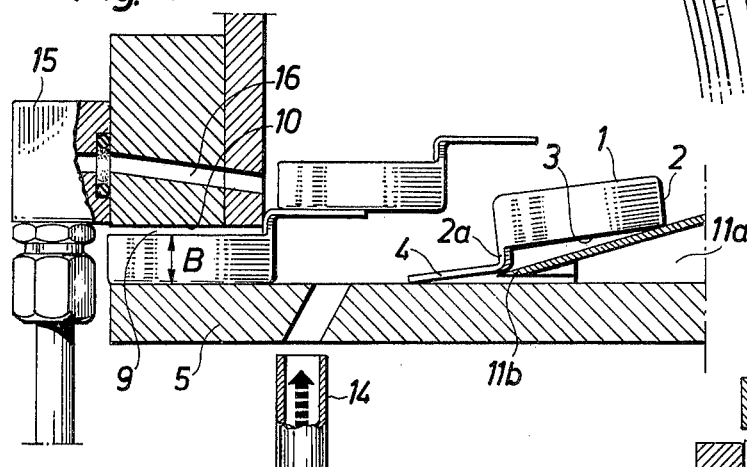
FIG. 2 shows an enlargement of a detail of the apparatus shown in FIG. 1.

Both embodiments of apparatus shown in the drawings include a circular, flat bottom table 5 which, at a distance from its edge 6, is provided with a row of through-holes 7. The holes 7 are spaced from each other at a distance preferably substantially equal to the diameter of the bottom panel 1 of a cap. As can be seen in FIG. 2 each hole 7 has substantially circular cross-section, although other shapes are possible, and is inclined in the axis of the table 5, extending inwardly and upwardly. The holes 7 come into register with stationary nozzles 14 through which air is blown as the table 5 rotates.

Slightly above the table 5 is a stationary side wall 8, a gap 9 being formed between the outer edge of the table 5 and the lower edge 10 of said side wall 8, this gap being slightly greater in height than the height B of the cylindrical wall 2 of the cap. The width of the gap 9 radially of the table 5 is substantially equal to the diameter of the cap.

Both embodiments are also provided with a discharge station 17 which, is defined by a gap or notch in wall 8 and has two blowing nozzles 18 and 19. The blowing nozzle 18 is oriented so as to direct a jet of air obliquely outwards (see the arrow E FIG. 6), so that correctly positioned caps will be blown out into an adjacent discharge channel 20. Incorrectly positioned caps, which might block the discharge station and will not pass therethrough, are in use blown inwards in the direction of the arrow G (FIG. 6) by air from the nozzle 19 which is aimed so that the jet of air is directed inwardly towards a conical sliding surface 11. Thus, only correctly oriented caps can pass through the discharge while incorrectly oriented caps will be recirculated in the apparatus by air from holes 7.

The conical sliding surface 11 with its apex upwards is arranged above the table 5 and, together with said table 5, forms a cap receiving surface. Caps are deposited on said conical surface 11 to slide down to the gap 9.

Figure 3:
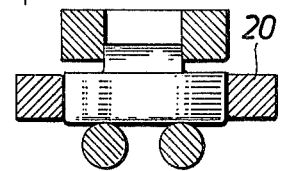
FIG. 3 shows a section of the discharge station of the apparatus of FIG. 1 on a larger scale.

If the embodiment of FIGS. 1 to 3 is now considered, it will be seen that above and on the axis of the conical sliding surface 11 there is arranged a fan 12 to blow air under the conical sliding surface (see arrows D) and out through a gap 11a formed between a lower edge 11b of the sliding surface 11 and the top of table 5. Between the underside of the sliding surface 11 and the table 5 are a number of vanes 13 to direct the air flow to pass out through the gap 11a. The conical sliding surface 11 may be stationary or may rotate slowly together with the table 5 which rotates, in use, only slowly, so that while strictly speaking some centrifugal force is applied to the caps this is not sufficient to cause them to move radially of the table 5. Air passing through gap 11a thus urges the caps towards the gap 9.

The lower edge 11b of the sliding surface is a short distance from the row of holes 7. Further blowing nozzles 15 (FIGS. 1 and 2) are provided, which co-operate with channels 16 passing through the side wall 8 of the apparatus and opening just above the lower edge 10 of the side wall. If one cap should be upon another (as in FIG. 2), it will be blown off by air from nozzles 15.

Extending from the side wall 8 and obliquely up over the sliding surface 11 in the direction of rotation are one or more stationary screening strips 29 which prevent caps from sliding down to the table 5 at or immediately before the discharge station 17 at which stage they would not necessarily have had time to be properly received by the gap 9.

Figure 4:
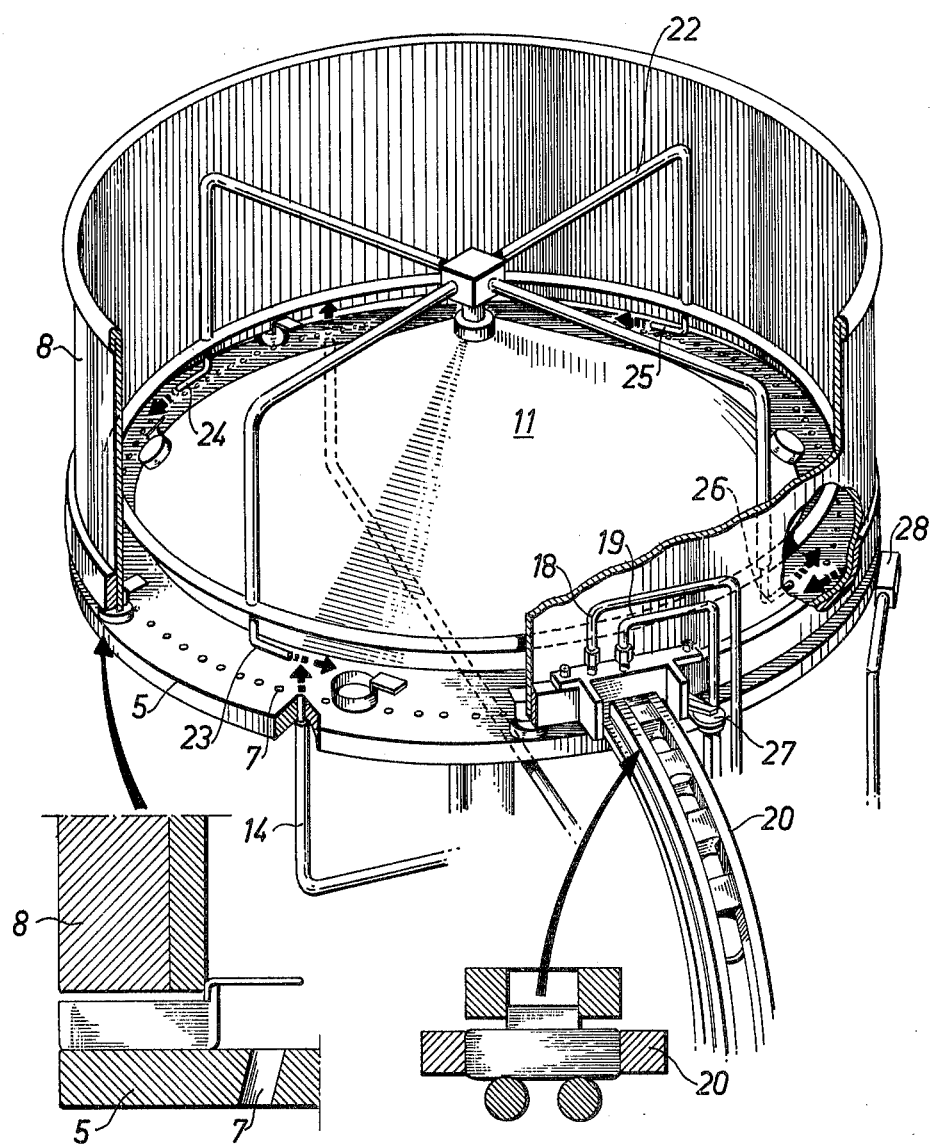
FIG. 4 shows a perspective view of another embodiment of apparatus of the invention.
Figure 5:
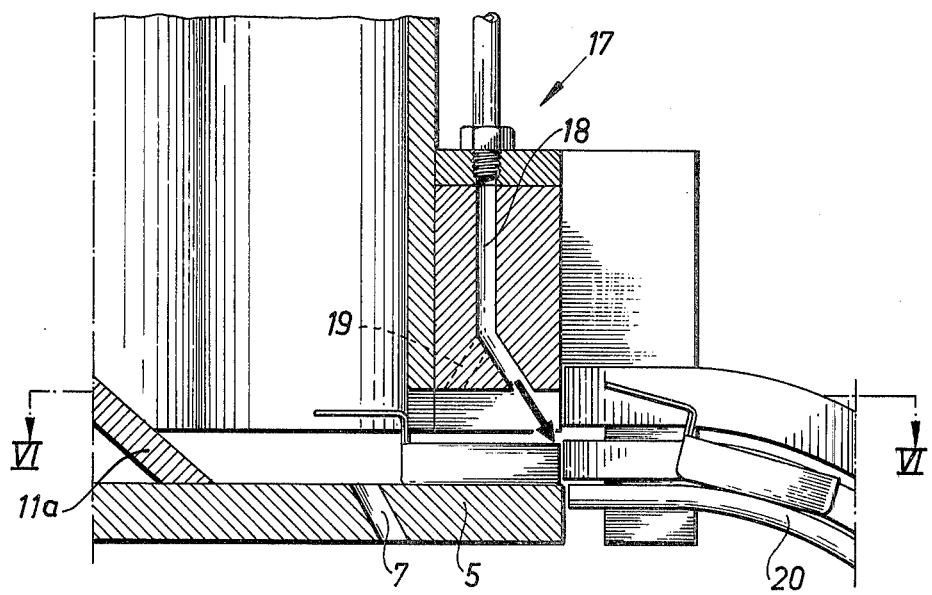
FIG. 5 is a section through the discharge station of the apparatus shown in FIG. 4.
Figure 6:
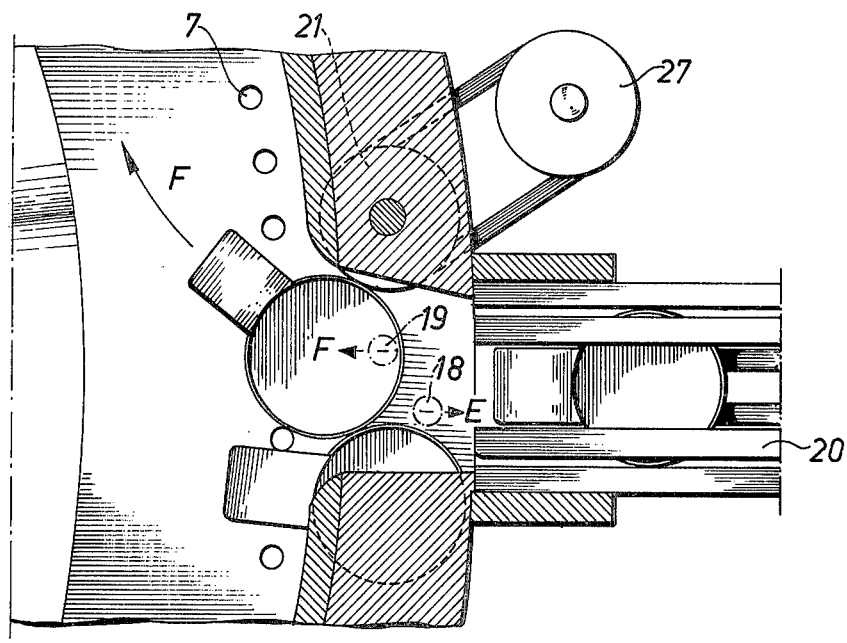
FIG. 6 is a top plan view of the discharge station shown in FIG. 5.

The alternative embodiment shown in FIGS. 4 to 6, differs in some respects. A rotating wheel 21 is arranged in the discharge opening to prevent the caps from piling up. Caps which have blocked the outlet can thus be turned and moved so that they are more easily moved away from the discharge outlet. Wheel 21 is driven by wheel 27 via a band drive.

This second embodiment has no gap between table 5 and conical surface 11. Instead, a distributing device 22 is provided in place of the fan 12. The distributing device 22 is provided with four blow nozzles 23, 24, 25, 26 to direct air obliquely outwardly and positioned to act in the space between the edge 11b of the sliding surface 11 and the row of holes 7. These nozzles are intended to direct air to blow the caps towards the periphery of the table. The distributing device 22 is pivotally journalled on a pin protruding from the centre of the sliding surface 11 and is connected thereby to a source of compressed air, not shown. When the apparatus is in operation the distributing member rotates slowly in the opposite direction to the table 5.

In the second embodiment there is also an additional blow nozzle 28 located a short distance after the discharge station in the direction of table rotation and intended to prevent any pile-up of the caps.

The apparatus shown in the drawings function in the following manner:

Caps are deposited randomly onto the sliding surface 11 and slide down to the table 5 where they are blown out towards the sorting gap 9 either by airflow through gap 11a or by the distributor device 22 as the case may be. Due to its design, the sorting gap will only accept correctly oriented caps, i.e. caps with the flat disc 1 in contact with the table 5 and with the gripping flap 4 turned upwards and inwards. The table 5 is moved relatively slowly in the direction of the arrow F (FIG. 1) in order gradually to bring correctly positioned caps to the discharge station 17. Incorrectly positioned caps will be blown back towards the sliding surface 11, either by air from the blow nozzles 14, 15 via the holes 7 and 16 respectively (FIGS. 1, 2) or by nozzle 19 (FIGS. 1, 4, 5 and 6) or nozzles 28 (FIG. 4). The screening strip 29 prevents caps blown away in this manner from sliding down close to the discharge station 17 and disturbing the discharge process. In the embodiment according to FIG. 4 the distributing device 22 will also tend to redistribute any group or collection of caps which might block the sorting gap 9.

Thus when caps which are correctly positioned in the sorting gap 9 are fed by the slow movement of the table 5 towards the discharge station 17, they will be transferred by the air jet from the nozzle 18 to the discharge channel 20 and the caps will thus have been positioned in a specific manner, i.e. in a row, one after the other, with the gripping flap pointing backwards in the direction of movement. Incorrectly oriented caps will not be accepted, and will be blown back by air from nozzles 19, this motion being assisted in the second embodiment by wheel 21 and nozzle 28.

Practical experiments with an apparatus constructed in accordance with the invention have shown the discharge capacity to the channel 20 to be extremely high and that disturbances in operation are rare.

The invention is not limited to the embodiments shown in the drawings but can be modified in many ways within the scope of the following claims. For instance, the table 5 need not be of disc shape, it could be annular.

The apparatus can of course also be used for orienting objects other than the above mentioned caps, in which case the sorting gap and other sorting aids should naturally be adapted to the objects in question.

I claim:

1. Apparatus for orienting and entraining open ended closure caps having a flat top opposite the open end and which are randomly deposited on a work surface defining a peripheral feed path for conveying the caps one by one in top-down orientation to an ouput opening, the improvement comprising:
    a deflector element overlying and spaced from a portion of the work surface so as to define a gap therebetween, means for injecting air between the deflector and the work surface to force air through the gap to tranverse the work surface laterally outwardly to carry the caps thereon outwardly toward the feed path, and
    means surrounding the work surface for flowing air obliquely thereto between the feed path and said deflector such that the force imposed upon each cap thereby is greater on top-up than on top-down oriented caps thereby to force only the former away from the feed path.

2. The apparatus of claim 1 in which said deflector comprises a truncated cone and said injecting means comprises a fan mounted within the small diameter opening so as to direct air to the interior thereof.

3. The apparatus of claim 2 comprising a plurality of generally radially extending guide vanes depending from the inner surface of the cone, the distal ends of which are bent in one direction relative to the work surface.

4. The apparatus of claim 3 in which said work surface is mounted for rotation in said one direction.

5. The apparatus of claim 1 in which said air flowing means comprises a plurality of closely adjacent air inlets formed in the work surface along the length of the feed path and means for causing air to pass upwardly through each of the inlets.

6. The apparatus of claim 5 in which said air inlets are spaced one from another by a distance substantially equal to the diameter of a cap top.

7. The apparatus of claim 6 in which said pattern of inlets is located laterally inwardly from the outer periphery of the feed path by a distance greater than the diameter of a cap top.

8. Apparatus for orienting and entraining open ended closure caps having a flat top opposite the open end and which are randomly deposited on a work surface defining a peripheral feed path for conveying the caps one by one in top-down orientation, to an output opening, the improvement comprising:

a plurality of nozzles mounted adjacent the work surface for rotation in one direction relative thereto, each of said nozzles being adapted to direct air generally in a direction opposite to said one direction, the work surface being mounted for rotation in said opposite direction whereby air from said nozzles carries caps on the work surface outwardly toward the feed path.

* * * * *